Oct. 11, 1966   B. M. WHEATON   3,277,634
SELF-CLEANING VENT FILTER FOR GRAIN BINS AND THE LIKE
Filed Oct. 9, 1963
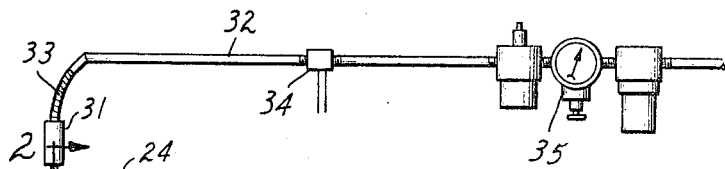
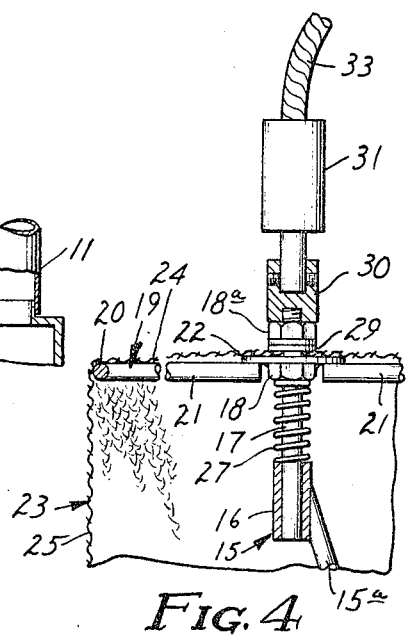
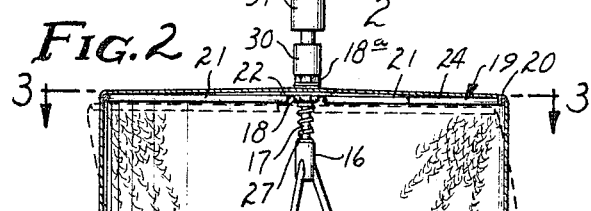
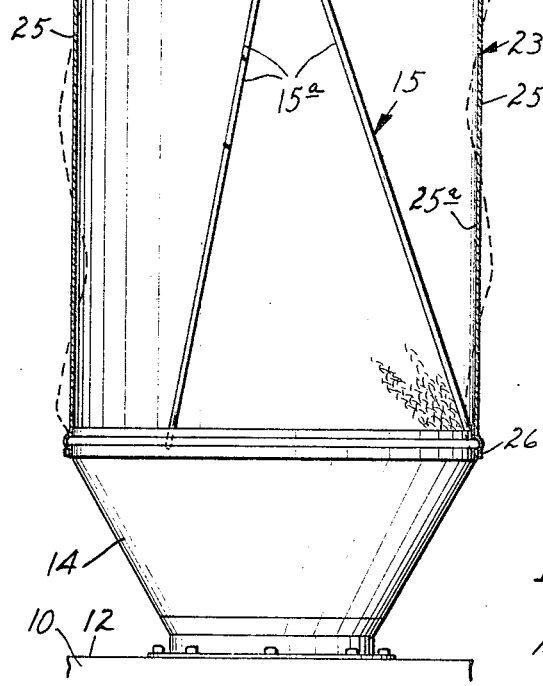
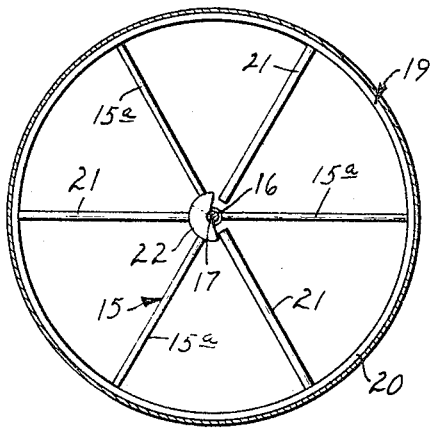
INVENTOR.
BRUCE M. WHEATON
BY
Merchant, Merchant + Gould
ATTORNEYS ns patent office 3,277,634
Patented Oct. 11, 1966

3,277,634
SELF-CLEANING VENT FILTER FOR GRAIN
BINS AND THE LIKE
Bruce M. Wheaton, Minneapolis, Minn., assignor to The
Day Company, Minneapolis, Minn., a corporation of
Minnesota
Filed Oct. 9, 1963, Ser. No. 314,931
3 Claims. (Cl. 55—304)

My invention relates generally to filtering means for storage bins, and more particularly to filters for the vent outlets of bins designed for storage of pulverulent materials and the like.

The primary object of my invention is the provision of a device of the class above described which is completely self-cleaning, and which will restore the pulverulent materials picked up by the filter element to the storage tank.

A further object of my invention is the provision of a device of the class above described which incorporates but a minimum of working parts and is foolproof and completely reliable in its operation.

A further object of my invention is the provision of a device of the class above described which incorporates a vertically disposed cylindrical wall element, in combination with novel means for imparting vertical reciprocation thereto for the most efficient results.

A further object of my invention is the provision of a device of the class above described which is provided with a readily replaceable filtering element.

A still further object of my invention is the provision of a device of the class above described which is relatively inexpensive to produce and which may be installed and serviced with a minimum of mechanical skill.

The above and still further objects of my invention will become apparent from the following detailed specifications, appended claims, and attached drawings.

Referring to the drawings wherein like characters indicate like parts throughout the several views:

FIG. 1 is a view in side elevation of bin installation illustrating my invention, some parts being broken away and some parts shown in section;

FIG. 2 is an enlarged view in axial section as seen generally from the line 2—2 of FIG. 1;

FIG. 3 is an enlarged view in horozintal section as seen from the line 3—3 of FIG. 2; and FIG. 4 is a greatly enlarged fragmentary detail view in axial section of a portion of FIG. 1, some parts being broken away and some parts shown in section.

Referring with greater particularity to the drawings, the numeral 10 indicates a conventional bin for the storage of grain or pulverulent material such as flour, and having an inlet 11, at one side of its horizontal upper end wall 12. At its intermediate portion, the upper end wall of bin 10 is shown as having a vent aperture 13.

Mounted on the upper end wall 12 in alignment with the vent aperture 13 is the tubular base 14 of my novel filter, preferably, and as shown, being frusto-conical in shape. Welded, or otherwise rigidly secured, at their lower ends to the upper end portion of the base 14 is a tripod leg structure, identified in its entirety by 15 and comprising a plurality of circumferentially spaced upwardly converging legs 15a. At their upper ends the legs 15a are rigidly secured to and support a vertically disposed tubular bearing element 16.

Slidably telescopically received in the upper end of the tubular bearing element 16 is a guide stem element 17 to the intermediate portion of which are mounted an opposed pair of screw-threaded clamping nuts 18 and 18a, the former of which defines a shoulder for a purpose which will hereinafter become apparent. Interposed between the clamping nuts 18 and 18a and carried thereby is a spider identified in its entirety by 19 and comprising an annular rim 20, radiating spokes 21, and a central annular hub 22.

Adapted to be draped over and supported by the spider 19 is an inverted cup-like filter element 23, preferably, and as shown, having an annular upper end wall 24 and a depending cylindrical side wall 25, the lower end portion of which is detachably but firmly secured to the upper end portion of the base 14, as indicated at 26.

Interposed between the tubular bearing element 16 and the shoulder-acting lock nut 18, in encompassing relationship with the upwardly projected portion of the guiding stem 17, is a coil compression spring 27 which is of sufficient axial dimension and compression value to maintain the cylindrical side wall 25 of the filter element 23 in a generally taut condition.

As shown particularly in FIG. 4, the upper side wall 24 of the filter element 23 is clamped between the annular hub 22 and the washer-equipped upper lock nut 18a adjacent the central opening 29 therein.

Operatively coupled to the stem 17, preferably, and as shown, through the medium of a socket-defining nut 30 screw-threadably carried by the upper end of the stem 17, is a conventional vibrator motor 31, preferably of the pneumatic type. Motor 31 is connected to a suitable air supply, not shown, through a conduit 32 having a flexible end section 33 which freely permits limited vertical reciprocation of the vibrator motor 31 and parts carried thereby.

While forming no part of the instant invention, air motor 31 may be controlled for automatic activation only during periods of bin filling by any suitable means such as a solenoid controlled shut-off valve 34. When vibrator motor 31 is activated, however, it imparts its vertical vibratory action directly to the cylindrical side wall 25 of the filter element 23. This produces a frequency which causes a standing wave in the filter wall 25, which is greatly exaggerated for purposes of illustration by dotted lines in FIG. 2. This vibration continuously loosens dust-like material which may tend to gather on the inner surface 25a of the wall 25 during passage of dust-laden air outwardly therethrough. Such loosened material obviously drops back into the bin 10 through the frusto-conical base 14, under the action of gravity.

It may be found necessary to vary the frequency of vibration imparted to the filter element 23 for best results, and for this purpose a suitable pressure regulating valve 35 may be provided.

My invention has been thoroughly tested and found to be entirely satisfactory for the accomplishment of the above objects; and while I have disclosed a preferred embodiment thereof, my invention may be capable of modification without departure from the scope and spirit of the appended claims.

The claims are:
1. Vent filter means for bins for storing pulverulent materials and the like, said filter means comprising:
 (a) an upstanding tubular base having means at its lower end for securing same to a bin in alignment with a vent opening in the upper wall thereof,
 (b) an inverted cup-like filter element having a cylindrical porous side wall,
 (c) means securing the open lower end of said filter element to the upper end of said base,
 (d) means carried by said base in inwardly spaced relation to the cylindrical side wall of said filter element for supporting the upper end wall of said filter element with the cylindrical wall thereof in a generally taut condition concentric with said base, said means comprising:
- (1) upstanding leg means within said filter element and terminating at its upper end in a tubular bearing below said upper end wall, the axis of which is generally concentric with the axis of said cylindrical wall,
- (2) a depending guide stem associated with said upper end wall and having its lower end telescopically slidably received in said bearing for vertical reciprocation, and
- (3) a coil compression spring interposed between said tubular bearing and said upper end wall, and (e) means for imparting reciprocatory movements to said upper end wall.

2. The structure defined in claim 1 in which the upper end wall of said filter element is likewise formed of porous material, and in which said means for supporting said filter element further comprises an annular spider which immediately underlies said upper end wall and which is secured to the intermediate portion of said stem for vertical reciprocation therewith.

3. The structure defined in claim 1 in which said leg means comprises a plurality of circumferentially spaced upwardly converging leg elements.

References Cited by the Examiner

UNITED STATES PATENTS

| | | | |
|---|---|---|---|
| 318,989 | 6/1885 | Ingraham | 55—304 |
| 333,021 | 12/1885 | Morgan | 55—304 |
| 1,295,711 | 2/1919 | Dod | 55—304 |

FOREIGN PATENTS

| | | |
|---|---|---|
| 906,402 | 3/1954 | Germany. |
| 845,113 | 8/1960 | Great Britain. |

HARRY B. THORNTON, *Primary Examiner.*